(12) United States Patent
Rathi et al.

(10) Patent No.: US 8,650,168 B2
(45) Date of Patent: Feb. 11, 2014

(54) METHODS OF PROCESSING FILES IN A MULTIPLE QUALITY OF SERVICE SYSTEM

(71) Applicant: Oracle International Corporation, Redwood City, CA (US)

(72) Inventors: Unmesh Rathi, Sunnyvale, CA (US); Kurt Alan Shoens, Los Altos, CA (US)

(73) Assignee: Oracle International Corporation, Redwood City, CA (US)

( * ) Notice: Subject to any disclaimer, the term of this patent is extended or adjusted under 35 U.S.C. 154(b) by 0 days.

(21) Appl. No.: 13/717,450

(22) Filed: Dec. 17, 2012

(65) Prior Publication Data

US 2013/0110893 A1    May 2, 2013

Related U.S. Application Data

(60) Continuation of application No. 12/075,020, filed on Mar. 7, 2008, now abandoned, which is a division of application No. 11/245,718, filed on Oct. 8, 2005, now abandoned.

(51) Int. Cl.
*G06F 7/00* (2006.01)
*G06F 17/00* (2006.01)

(52) U.S. Cl.
USPC .......................................................... 707/694

(58) Field of Classification Search
USPC .......................................................... 707/694
See application file for complete search history.

(56) References Cited

U.S. PATENT DOCUMENTS

| | | | |
|---|---|---|---|
| 7,225,211 B1 * | 5/2007 | Colgrove et al. | 707/693 |
| 2006/0010150 A1 * | 1/2006 | Shaath et al. | 707/102 |

* cited by examiner

*Primary Examiner* — Fred I Ehichioya
*Assistant Examiner* — Kris Mackes
(74) *Attorney, Agent, or Firm* — Marsh Fischmann & Breyfogle LLP; Daniel J. Sherwinter

(57) ABSTRACT

The invention relates to a multiple QoS file system and methods of processing files at different QoS according to rules. The invention allocates multiple VLUNs at different qualities of service to the multiQoS file system. Using the rules, the file system chooses an initial QoS for a file when created. Thereafter, the file system moves files to different QoS using rules. Users of the file system see a single unified space of files, while administrators place files on storage with the new cost and performance according to attributes of the files. A multiQoS file system enhances the descriptive information for each file to contain the chosen QoS for the file.

20 Claims, 17 Drawing Sheets

MultiQoS File System

User Based QoS

Enter Desired Capacity by Quality of Service for the Current Users

| User ID | High QoS Capacity | Medium QoS Capacity | Low QoS Capacity | Archive QoS Capacity |
|---|---|---|---|---|
| User A | 100 MB | 500 MB | 10000 MB | 50000 MB |
| User B | 200 MB | 2000 MB | 40000 MB | 90000 MB |
| User C | 0 MB | 10 MB | 500 MB | 5000 MB |
| | MB | MB | MB | MB |
| | MB | MB | MB | MB |

FIGURE 2

MultiQoS File System
File Type Based QoS

Enter Desired Quality of Service for the File Types

| File Type | High QoS | Medium QoS | Low QoS | Archive QoS |
|---|---|---|---|---|
| MP3 | ☐ | ☐ | ● | ☐ |
| ZIP | ☐ | ☐ | ☐ | ● |
| TAR | ☐ | ☐ | ☐ | ● |
| PST | ☐ | ☐ | ● | ☐ |
| jPEG | ☐ | ☐ | ● | ☐ |
| C++ | ● | ☐ | ☐ | ☐ |
| PPT | ☐ | ● | ☐ | ☐ |

FIGURE 4

MultiQoS File System
Capacity Threshold Based QoS

Enter Desired Capacity Threshold to Migrate to Next Lower Quality of Service Level

High QoS to Medium QoS

[ 80 ] %

Medium QoS to Low QoS

[ 60 ] %

Low QoS to Archive QoS

[ 85 ] %

Migration Size

[ 5 ] MB

- or -

High QoS to Medium QoS

[   ] MB

Medium QoS to Low QoS

[   ] MB

Low QoS to Archive QoS

[   ] MB

Migration Size

[   ] MB

Migration Alert?
✓ YES
○ No

FIGURE 5

MultiQoS File System
File Activity Based QoS

Enter File Activity Values to Migrate Between Quality of Service Levels

DOWNWARD MIGRATION

High QoS to Medium QoS

READS  <  [ 10 ]  Accesses/Day

WRITES  <  [ 50 ]  KB/Wk

Medium QoS to Low QoS

READS  <  [ 4 ]  Accesses/Day

WRITES  <  [ 20 ]  KB/Wk

Low QoS to Archive QoS

READS  <  [ 2 ]  Accesses/Day

WRITES  <  [ 10 ]  KB/Wk

UPWARD MIGRATION

Medium QoS to High QoS

READS  >  [ 12 ]  Accesses/Day

WRITES  >  [ 75 ]  KB/Wk

Low QoS to Medium QoS

READS  >  [ 5 ]  Accesses/Day

WRITES  >  [ 5 ]  KB/Wk

Archive QoS to Low QoS

READS  >  [ 1 ]  Accesses/Day

WRITES  >  [ 1 ]  KB/Wk

FIGURE 6

| VLUN Quality Of Service | 4-bit QoS Code |
|---|---|
| HIGH | 0000 |
|  | 0001 |
| MEDIUM | 0010 |
|  | 0011 |
| LOW | 0100 |
|  | 0101 |
|  | 0110 |
|  | 0111 |
| ARCHIVE | 1000 |
|  | 1001 |
|  | 1010 |
|  | 1011 |
|  | 1100 |
|  | 1101 |
|  | 1110 |
|  | 1111 |

FIGURE 10B

| 4-bit QoS Code | VLUN Quality Of Service |
|---|---|
| 1000 | HIGH |
| 0100 | MEDIUM |
| 0010 | LOW |
| 0001 | ARCHIVE |

FIGURE 10A

METHODS OF PROCESSING FILES IN A MULTIPLE QUALITY OF SERVICE SYSTEM

This application is a continuation of U.S. application Ser. No. 12/075,020, METHODS OF PROCESSING FILES IN A MULTIPLE QUALITY OF SERVICE FILE SYSTEM, filed on Mar. 7, 2008; which is a divisional of U.S. Application No. 2005, A Multiple Quality of Service File System, filed on Oct. 8, 2005; both of which being incorporated by reference herein.

BACKGROUND

The present invention relates to management of file systems and large files.

This application incorporates by reference herein as follows:

U.S. application Ser. No. 10/264,603, Systems and Methods of Multiple Access Paths to Single Ported Storage Devices, filed on Oct. 3, 2002, now abandoned;

U.S. application Ser. No. 10/354,797, Methods and Systems of Host Caching, filed on Jan. 29, 2003, now U.S. Pat. No. 6,965,979 B2;

U.S. application Ser. No. 10/397,610, Methods and Systems for Management of System Metadata, filed on Mar. 26, 2003, now U.S. Pat. No. 7,216,253 B2;

U.S. application Ser. No. 10/440,347, Methods and Systems of Cache Memory Management and Snapshot Operations, filed on May 16, 2003, now U.S. Pat. No. 7,124,243 B2;

U.S. application Ser. No. 10/600,417, Systems and Methods of Data Migration in Snapshot Operations, filed on Jun. 19, 2003, now U.S. Pat. No. 7,136,974 B2;

U.S. application Ser. No. 10/616,128, Snapshots of File Systems in Data Storage Systems, filed on Jul. 8, 2003, now U.S. Pat. No. 6,959,313 B2;

U.S. application Ser. No. 10/677,560, Systems and Methods of Multiple Access Paths to Single Ported Storage Devices, filed on Oct. 1, 2003, now abandoned;

U.S. application Ser. No. 10/696,327, Data Replication in Data Storage Systems, filed on Oct. 28, 2003, now U.S. Pat. No. 7,143,122 B2;

U.S. application Ser. No. 10/837,322, Guided Configuration of Data Storage Systems, filed on Apr. 30, 2004, now U.S. Pat. No. 7,216,192 B2;

U.S. application Ser. No. 10/975,290, Staggered Writing for Data Storage Systems, filed on Oct. 27, 2004;

U.S. application Ser. No. 10/976,430, Management of I/O Operations in Data Storage Systems, filed on Oct. 29, 2004, now U.S. Pat. No. 7,222,223 B2; and U.S. application Ser. No. 11/122,495, Quality of Service for Data Storage Volumes, filed on May 4, 2005.

Data storage systems today must handle larger and more numerous files for longer periods of time than in the past. Thus, more than in the past active data is a shrinking part of the entire data set of a file system leading to inefficient use of expensive high performance storage. This impacts data storage backups and lifecycle management/compliance.

As background, a file is a unit of information stored and retrieved from storage devices (e.g., magnetic disks). A file has a name, data, and attributes (e.g., the last time it was modified, its size, etc.). A file system is that part of the operating system that handles files. To keep track of the files, the file system has directories. The directory contains directory entries which in turn consist of file names, file attributes, and addresses of the data blocks. Unix operating systems split this information into two separate structures: an i-node containing the file attributes and addresses of the data blocks and directory entries containing file names and where to find the i-nodes. If the file system uses i-nodes, the directory entry contains just a file name and an i-node number. An i-node is a data structure associated with exactly one file and lists that file's attributes and addresses of the data blocks. File systems are often organized in a tree of directories and each file may be specified by giving the path from the root directory to the file name.

To address inefficient use of expensive high performance data storage, third party archiving and hierarchical storage management (HSM) software migrate data from expensive high performance storage devices (e.g., Fibre channel) to lower cost storage devices such as tape or Serial ATA storage devices.

Archival and HSM software must manage separate storage volumes and file systems. Archival software not only physically moves old data but removes the file from the original file namespace. Although symbolic links can simulate the original namespace, this approach requires the target storage be provisioned as another file system thus increasing the IT administrator workload.

Archival and HSM software also don't integrate well with snapshots. The older the data, the more likely it is to be part of multiple snapshots. Archival software that moves old data does not free snapshot space on high performance storage. HSM software works at the virtual file system and i-node level, and is unaware of the block layout of the underlying file system or the block sharing among snapshots when it truncates the file in the original file system. With the two data stores approach, the user quota is typically enforced on only one data store, that is, the primary data store. Also, usually each data store has its own snapshots and these snapshots are not coordinated.

Archival software also does not control initial file placement and is inefficient for a large class of data that ultimately ends up being archived. Since archival software is not privy to initial placement decisions, it will not provide different quality of service (QoS) in a file system to multiple users and data types.

Archiving software also ends up consuming production bandwidth to migrate the data. To minimize interference with production, archiving software typically is scheduled during non-production hours. They are not optimized to leverage idle bandwidth of a storage system.

NAS applications may create large files with small active data sets. Some examples include large databases and digital video post-production storage. The large file uses high performance storage even if only a small part of the data is active.

Archiving software has integration issues, high administrative overhead and may even require application redesign. It may also require reconsideration of system issues like high availability, interoperability, and upgrade processes. It would be desirable to eliminate cost, administrative overhead, and provide different QoS in an integrated manner.

SUMMARY OF THE INVENTION

The invention relates to a multiple QoS (multiQoS) file system and methods of processing files at different QoS according to IT administrator-specified rules. The invention allocates multiple VLUNs at different qualities of service to the multiQoS file system. Using the IT administrator-specified rules, the file system can assign an initial QoS for a file when created. Thereafter the file system moves files to a different QoS using IT administrator-specified rules. Users of the file system see a single unified name space of files. A multiQoS file system enhances the descriptive information for each file to contain the QoS of the file.

BRIEF DESCRIPTION OF THE DRAWINGS

FIG. 2 illustrates a user interface (UI) for entering the user capacity at each QoS.

FIG. 4 illustrates a UI for entering a QoS for each file type.

FIG. 5 illustrates a UI for entering capacity thresholds for migration of files.

FIG. 6 illustrates a UI for entering a required file activity to migrate files between different QoS.

FIG. 10A is an embodiment of a map between a 4-bit QoS code and four QoS levels.

FIG. 10B is another embodiment illustrating how a 4-bit QoS code can implement sixteen QoS levels.

DETAILED DESCRIPTION OF THE PREFERRED EMBODIMENTS

The following description includes the best mode of carrying out the invention, illustrates the principles of the invention, uses illustrative values and should not be taken in a limiting sense. The scope of the invention is determined by reference to the claims. Each part or step is assigned its own number in the specification and drawings. Many features of the invention will be now described using the phrase quality of service or simply QoS. This phrase is not essential to the invention. It is merely used to distinguish between different levels of performance and/or reliability.

Figure 1:
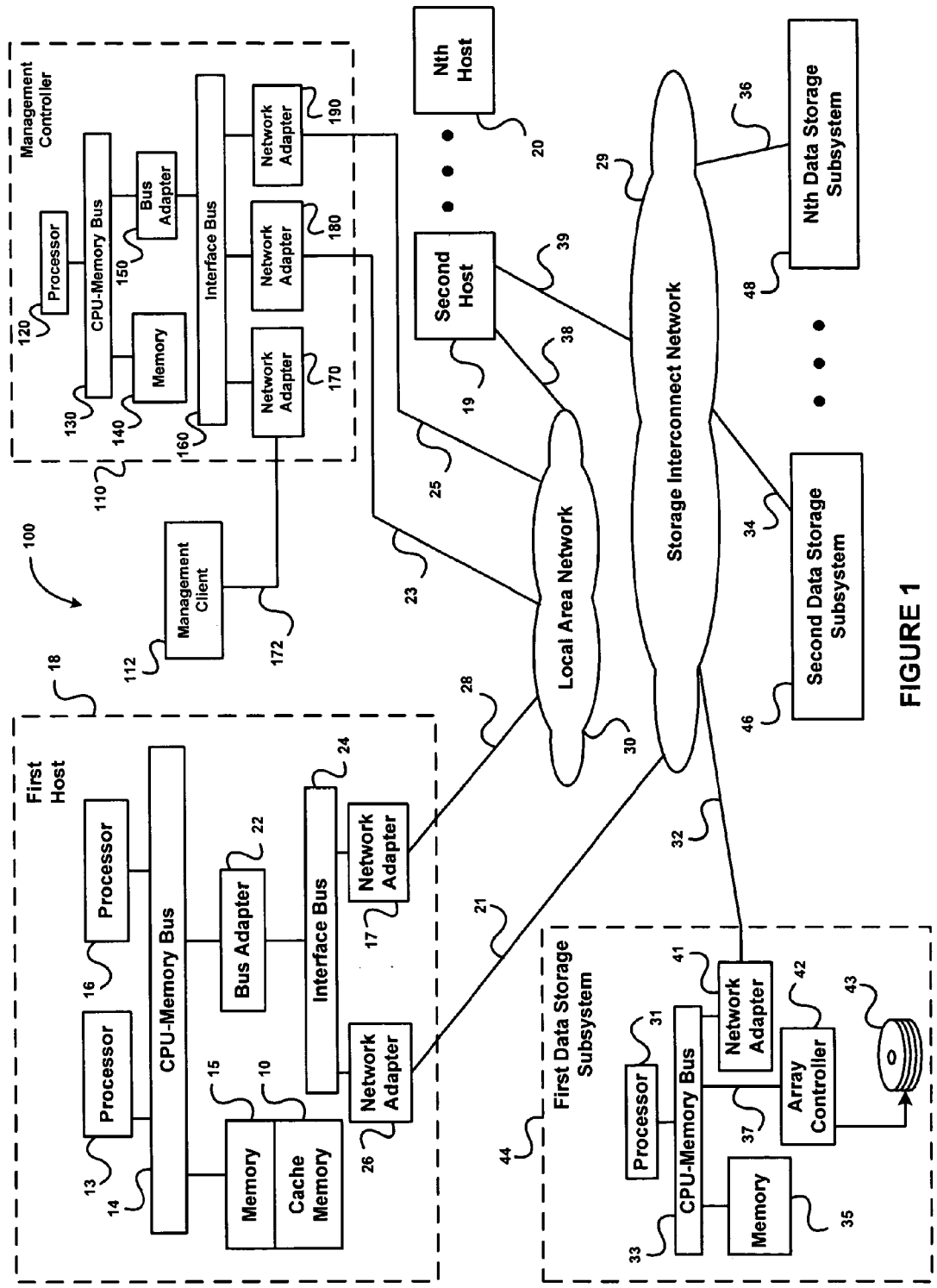
FIG. 1 illustrates a data storage system and provides details of a host, a data storage subsystem, and a management controller.

FIG. 1 illustrates a data storage system 100 that includes first through Nth hosts 18, 19 and 20, and first through Nth data storage subsystems 44, 46 and 48. Each host is a computer that can connect to clients, data storage subsystems and other hosts using software/hardware interfaces such as network interface cards and software drivers to implement Ethernet, Fibre Channel, ATM, SCSI, InfiniBand, etc. Hennessy and Patterson, *Computer Architecture: A Quantitative Approach* (2003), and Patterson and Hennessy, *Computer Organization and Design: The Hardware/Software Interface* (2004) describe computer hardware and software, storage systems, memory, caching and networks and are incorporated herein by reference.

Each host runs an operating system such as Linux, UNIX, a Microsoft OS, or another suitable operating system. Tanenbaum, *Modern Operating Systems* (2001), Bovet and Cesati, *Understanding the Linux Kernel* (2001), and Bach, *Design of the Unix Operating System* (1986) describe operating systems in detail and are incorporated by reference herein.

FIG. 1 shows the first host 18 includes a CPU-memory bus 14 that communicates with the processors 13 and 16 and a memory 15. The processors 13 and 16 used are not essential to the invention and could be any suitable general-purpose processor such as an Intel Pentium processor, an ASIC dedicated to perform the operations described herein, or a field programmable gate array (FPGA).

Each host includes a bus adapter 22 between the CPU-memory bus 14 and an interface bus 24, which in turn interfaces with network adapters 17 and 26. The first host 18 communicates through the network adapter 17 over link 28 with the local area network (LAN) 30 with other hosts. The first host 18 also communicates through the network adapter 26 over a link 21 with a storage interconnect network 29. Similarly, the second host 19 communicates over links 38 and 39 with the LAN 30 and the storage interconnect network 29, respectively. The storage interconnect network 29 also communicates over links 32, 34, and 36 with the data storage subsystems 44, 46, and 48, respectively. In sum, the hosts 18, 19 and 20 communicate with each other, the LAN 30 and storage interconnect network 29 and data storage subsystems 44, 46, and 48.

The LAN 30 and the storage interconnect network 29 can be separate networks as illustrated or combined in a single network, and may be any suitable known bus, SAN, LAN, or WAN technology such as Fibre Channel, SCSI, InfiniBand, or Ethernet, and the type of interconnect is not essential to the invention. See Kembel, *The FibreChannel Consultant, A Comprehensive Introduction* (1998), Kembel, *The Fibre-Channel Consultant, Arbitrated Loop* (1996-1997) The Fibre-Channel Consultant, *Fibre Channel Switched Fabric* (2001), Clark, *Designing Storage Area Networks* (2003), Clark, *IP SANs: A Guide to iSCSI, iFCP, and FCIP Protocols for Storage Area Networks* (2002) and Clark, *Designing Storage Area Networks* (1999), which are incorporated by reference herein.

FIG. 1 shows the first data storage subsystem 44 includes a CPU-memory bus 33 that communicates with the processor 31 and a memory 35. The processor 31 used is not essential to the invention and can be any suitable general-purpose processor such as an Intel Pentium processor, an ASIC dedicated to perform the operations described herein, or a field programmable gate array (FPGA). The CPU-memory bus 33 communicates through an adapter 41 and link 32 with the storage interconnect network 29 and through a link 37 to an array controller 42, such as a RAID controller, interfacing with an array of storage devices (e.g., a disk array 43).

U.S. application Ser. No. 10/677,560, Systems and Methods of Multiple Access Paths to Single Ported Storage Devices, filed on Oct. 1, 2003 describes suitable data storage subsystems, and is incorporated by reference herein. In alternative embodiments, any suitable controller and compatible storage device(s) can be used (e.g. tape drives or semiconductor memory) in the data storage subsystem. Massiglia, *The RAID Book: A Storage System Technology Handbook* (6th Edition, 1997) describing RAID technology is incorporated by reference herein.

A host may access secondary storage devices (e.g., hard disk drives) through a VLUN (virtual logical unit) that abstracts the storage device(s) as a linear array of fixed-size blocks. A logical block address (LBA) identifies each fixed-sized block. The data storage system constructs a VLUN from all or parts of several physical storage devices such as disk drives. To make a large VLUN, a data storage system may concatenate space allocated from several storage devices. To improve performance, the data storage system maps adjacent regions of VLUN space onto different physical storage devices (striping). To improve reliability, the system holds multiple copies of a VLUN on different storage devices (mirroring).

In operation, a user requests an I/O operation of one of the hosts 18, 19, or 20 which will transmit the request on the LAN 30 or the storage interconnect network 29 to one or more of the data storage subsystems 44, 46, or 48.

If a write is received, the data storage subsystem 44 can use a write-through scheme and not acknowledge the write until the data is written to nonvolatile memory (e.g., disk array 43). This ensures data consistency between the host and data storage subsystem in the event of a power failure, etc.

In a write-back scheme, the data storage subsystem 44 acknowledges the write before data is written to disk array 43 and stores the data in nonvolatile memory (e.g., battery backed RAM) until written to the disk array to ensure data consistency.

FIG. 1 illustrates a management client 112 that communicates over link 172 (e.g., using Ethernet) with a management controller 110. The management controller 110 includes a CPU-memory bus 130 that communicates with a processor 120 and a memory 140. The processor 120 can be any general-purpose processor such as an Intel Pentium processor, a dedicated ASIC or FPGA. The management controller 110 includes a bus adapter 150 between the CPU-memory bus 130 and an interface bus 160 interfacing with network adapters 170, 180, and 190. The management controller 110 communicates through network adapter 180 over link 23 or link 25, the LAN 30, and the link 28 with the first host 18. The management client 112 includes the hardware, plus display and input devices such as a keyboard and mouse.

Provisioning a MultiQoS File System

A multiQoS file system can be provisioned by specifying the initial, incremental and maximum capacities of the storage or specifying the initial, incremental, and maximum storage for each QoS VLUN. Or a multiQoS file system can be provisioned by specifying the overall initial, incremental, maximum storage and providing percentages for each QoS.

The provisioning can be also driven by rules. FIG. 2 illustrates a user interface (UI) at the management client 112 that allows the IT administrator to enter values of user capacity at different QoS. The user capacities can be determined by departmental requirements, budgets, or by dividing the total available storage at each QoS among the users. The UI is illustrated as a graphical user interface (GUI) but could be a command line interface. Also the name and number of column headings in the table: high QoS, medium QoS, low QoS and archive QoS are not essential to the invention; other headings such as high, medium, and low performance, or high, medium, low priority and so forth can be used as long as they meet user requirements.

The UI can be implemented in client software or in a client-server architecture. If the UI is implemented as a Web application, the IT administrator can open a browser (e.g., Microsoft Internet Explorer or Firefox) on management client 112, request a Web form (FIG. 2), enter values of user capacity in the Web form, and submit the values to the management controller 112. A Web server in or connected to the management controller 112 will connect or will have an established connection to a database (not shown) that stores the values. In an alternative to the Web application, a relational database server can run in a management controller 110 that waits for a database client running on management client 112 to request a connection. Once the connection is made (typically using TCP sockets), the database client sends a SQL query to the database server, which returns a document to receive user capacity values from the database client.

The management controller 110 next transmits the user capacity values to the first host 18 that allocates a VLUN in memory 15 at each QoS. The file system provides capacity on a VLUN to place file system core structures (e.g., boot block, super block, free space management, i-nodes, and root directory). For example, the management controller 110 can place the core file system structures in the highest QoS VLUN.

Figure 3:
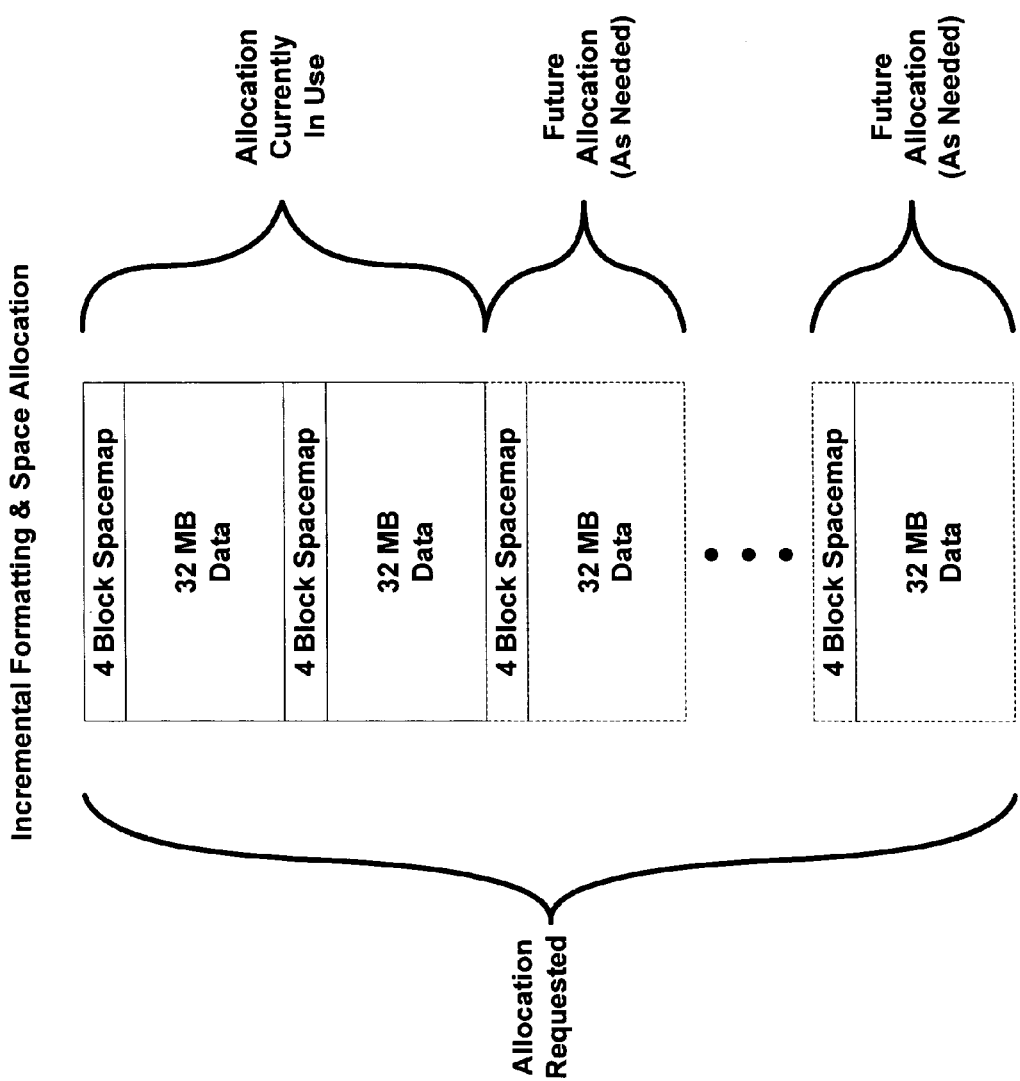
FIG. 3 illustrates incremental formatting and space allocation.

To format a multiQoS file system, the file system writes the core structures into the chosen VLUN. The file system then initializes space allocation data structures in all of the VLUNs assigned to the multiQoS file system. In an embodiment, the file system maintains a high water mark for each VLUN that indicates how far in each VLUN the file system has initialized space allocation information. In an embodiment, the multiQoS file system formats a limited amount of space allocation information such as 32 megabytes (MB). If the file system runs out of the initial 32 MB allocated to a VLUN, it can format the next 32 MB and updates the high water mark to show where to format the next increment of space for that VLUN. FIG. 3 illustrates one method of incremental formatting and space allocation. U.S. application Ser. No. 10/616,128, Snapshots of File Systems in Data Storage Systems, filed on Jul. 8, 2003, incorporated by reference herein, describes one format of the file system blocks.

Expanding a MultiQoS File System

After the IT administrator creates a multiQoS file system, a VLUN at a certain QoS and attached to the file system may run short on space. When the multiQoS file system reaches the high water mark that indicates how much capacity has been used up for a VLUN, it requests additional space be allocated to that VLUN, the management controller 110 expands the VLUN corresponding to the QoS and notifies the file system of the expansion. The file system formats the space allocation information in the VLUN to account for the new space. The IT administrator can specify a spill-over rule where instead of expanding the exhausted QoS VLUN, the new data may be spilled over into higher or lower QoS VLUNs that are already allocated to the multiQoS file system. As an example, the rule could enable spill over when allocated space utilization is below a threshold (e.g., 40% of total storage capacity).

The IT administrator can also add a new QoS to the multiQoS file system. In that case, the management controller 110 will allocate a new VLUN at the new QoS and attach it to the multiQoS file system. The file system formats all or a portion of the space allocation information in the new VLUN. The IT administrator will also need to update rules that select the QoS for files to use the new QoS. A later section describes how to change the rules.

Compacting and Shrinking a MultiQoS File System

The IT administrator can compact a multiQoS file system by migrating all files from the VLUN to be vacated to remaining VLUNs. Once a VLUN is completely empty, it can be returned to the storage pool, thus shrinking the storage allocated to the multiQoS file system. This migration can be done by adding a rule or it can be done on demand as described in the section on synthetic namespace below.

Creating a File in a MultiQoS File System

When a user creates a new file in a multiQoS file system, the file system checks the rules associated with the file system to select the initial QoS for the file and its attributes. The file system then allocates blocks for the file from the VLUN assigned to the file system with the desired QoS.

In some protocols, such as Common Internet File System (CIFS), applications can specify the amount of space to reserve for the file. The file system can use the reserved space information to estimate the eventual size of the file and in turn use that estimate in the rules. For example, if the rules place files larger than 1 gigabyte on low QoS storage and the CIFS application reserves four gigabytes (GB), the file system will place such a file on low QoS storage. Norton et al., *Storage Networking Industry Association, Common Internet File System (CIFS)—Technical Reference Revision:* 1.0 (2002) describe the details of CIFS and is incorporated by reference herein.

Other protocols, such as Network File System (NFS), do not permit specifying the intended size of a file. Thus, an IT administrator can specify rules storing part of a file (e.g., first gigabyte) at one QoS and another part at another level. A multiQoS file system can also indicate the QoS of a block by using the top bits of the block address so a file can have blocks at different qualities of service levels.

Establishing Initial Placement Rules

The IT administrator can specify initial placement rules that establish QoS by file type. Many operating systems support two-part file names. For example, in a file named "file1.PDF", the extension PDF is the file type. Linux and Unix also support three-part file names such as "file1.PDF.Z." The extensions ("PDF" and "Z") indicate the file type is PDF compressed with the Ziv-Lempel algorithm.

FIG. 4 illustrates a UI that can be implemented using the same type of software and hardware described in FIG. 2. It permits the IT administrator to establish a QoS by file type. In FIG. 4, the IT administrator has clicked the buttons in the UI to place C++ files in high QoS, Powerpoint (.ppt) in medium QoS, OutLook (.pst), MP3, and JPEG in low QoS, and ZIP and TAR in archive QoS. Tanenbaum, *Modern Operating Systems* (2001), including chapter six, incorporated by reference herein, describes file systems and lists other file types. The file type as indicated by file name extension is an example of more general rule which matches file name to any predetermined pattern (e.g. "foo*.txt") to deduce initial QoS for the file.

Another placement rule is to place the files according to user ID or group ID. For example, an email service provider could use the rule to place emails belonging to premium customers in high QoS storage.

Another placement rule is to place files by file size. For example, a university administrator may restrict very large files typically downloaded by students to low QoS despite quota rules that might have allowed them to be placed on a higher QoS.

Another placement rule is to place files by folder. All files in a particular folder of the file system are placed in the same QoS VLUN. Placement by folder allocates differential QoS storage to projects as a single file system.

Migration Rules

The IT administrator can specify other migration rules. FIG. 5 illustrates a UI for the IT administrator to set capacity thresholds for migration of files. If, as shown 20% or 500 MB of the high QoS storage is used, files will migrate down, as explained below, from high QoS to medium QoS. If combined with a first-in-first-out rule, this results in migration of older files to lower QoS. If 60% or 1,000 MB of medium QoS storage is used, files migrate down from medium QoS to low QoS, and if 85% or 10,000 MB of low QoS storage is used, files migrate down from low QoS to archive storage. As a benefit, migration tends to defragment files.

It is suggested to migrate a file in a chunk (also referred to as an extent) in a background process rather than all at once to avoid adverse impact to the bandwidth of the storage interconnect network. An IT administrator can define the chunk size also referred to as the migration size in terms of MB. A single migration size can be used for all migration whether up or down as shown in FIG. 5. The migration size can also depend on whether the migration is up or down or on even the pair of QoS involved. The UI also allows the IT administrator to set a migration alert to send an email alert to someone or simply be displayed at the management client 112.

The multiQoS file system can set a file activity rule to trigger migration of a file. Reading and writing to a file over time is a measure of file activity. FIG. 6 illustrates a UI for entering values of file activity for migration of a file between QoS. If, as shown, the file has less than ten reads per day or less than 50 KB per week is written to the file, the file migrates from high to medium QoS. Similarly, if the file has less than four reads per day or less than 20 KB per week is written to the file, the file migrates from medium to low QoS. Finally, if the file has less than two reads per day or less than 10 KB per week is written to the file, the file migrates from low to archive QoS.

FIG. 6 also illustrates fields for entering values of file activity for upward migration of a file. If, as shown, the file has more than twelve reads per day or more than 75 KB per week is written to the file, the file migrates from medium to high QoS. Similarly, if the file has more than five reads per day or more than 5 KB/week is written to the file, the file migrates from low to medium QoS. And if the file has more than one read per day or more than 1 KB/week is written to the file, the file migrates from archive to low QoS.

Figure 7:
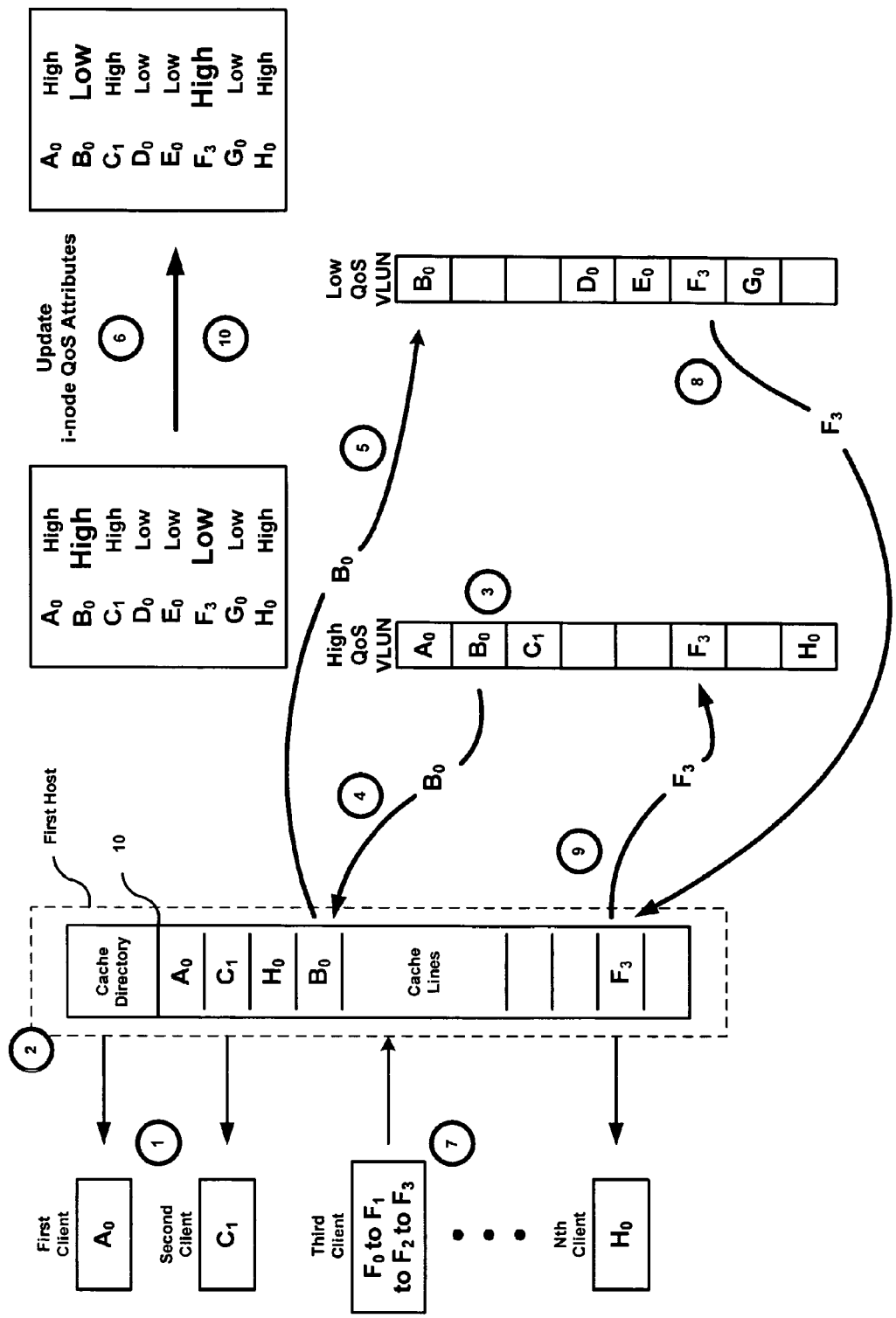
FIG. 7 illustrates migration of files between different QoS.

FIG. 7 illustrates an abstract view of a data storage system engaged in file migration. The data storage system includes a first host 18, including a cache memory 10, and two QoS of secondary storage represented by a high QoS VLUN and a low QoS VLUN. Letters A through H represent files. The subscript of each letter represents the version of a file. The first through the Nth client applications will access the files using processes and threads.

To illustrate, assume the IT administrator sets a rule that if a file is not accessed once in a month, it should migrate from high to low performance storage as represented by high QoS VLUN to low QoS VLUN. We also assume if a file is accessed more than once in a month, it should migrate from low to high performance storage. We look at one month in this example, but the time period can be shorter or longer. Finally, we assume steps 1-3 and 7 occur in the month. At step 1, the first client reads file $A_0$, the second client reads $C_1$, the third client accesses the file F, writing versions $F_1$-$F_3$, and the Nth client reads file $H_0$. At step 2, the host stages the active files in cache memory as appropriate. At step 3, the host runs a background process that checks file attributes, applies the rules and identifies all files that need to migrate.

Based on this, the host migrates inactive file $B_0$ from high to low performance storage. To accomplish this, the host stages file $B_0$ into cache at step 4. Further, the host writes file $B_0$ to the low QoS VLUN at step 5. At step 6, the host updates the directory entry or i-node of file $B_0$ to indicate it is now in the low QoS VLUN. At step 7, the host identifies file F was repeatedly accessed during the month so must migrate from low to high performance storage. At step 8, the host stages file $F_3$ into cache, and at step 9 writes file $F_3$ to the high QoS VLUN. At step 10, the host updates the directory entry or the i-node of $F_3$ to indicate its blocks are in the high QoS VLUN. A background process writes the files to secondary storage when appropriate in either a write-back or write-through scheme.

Figure 8:
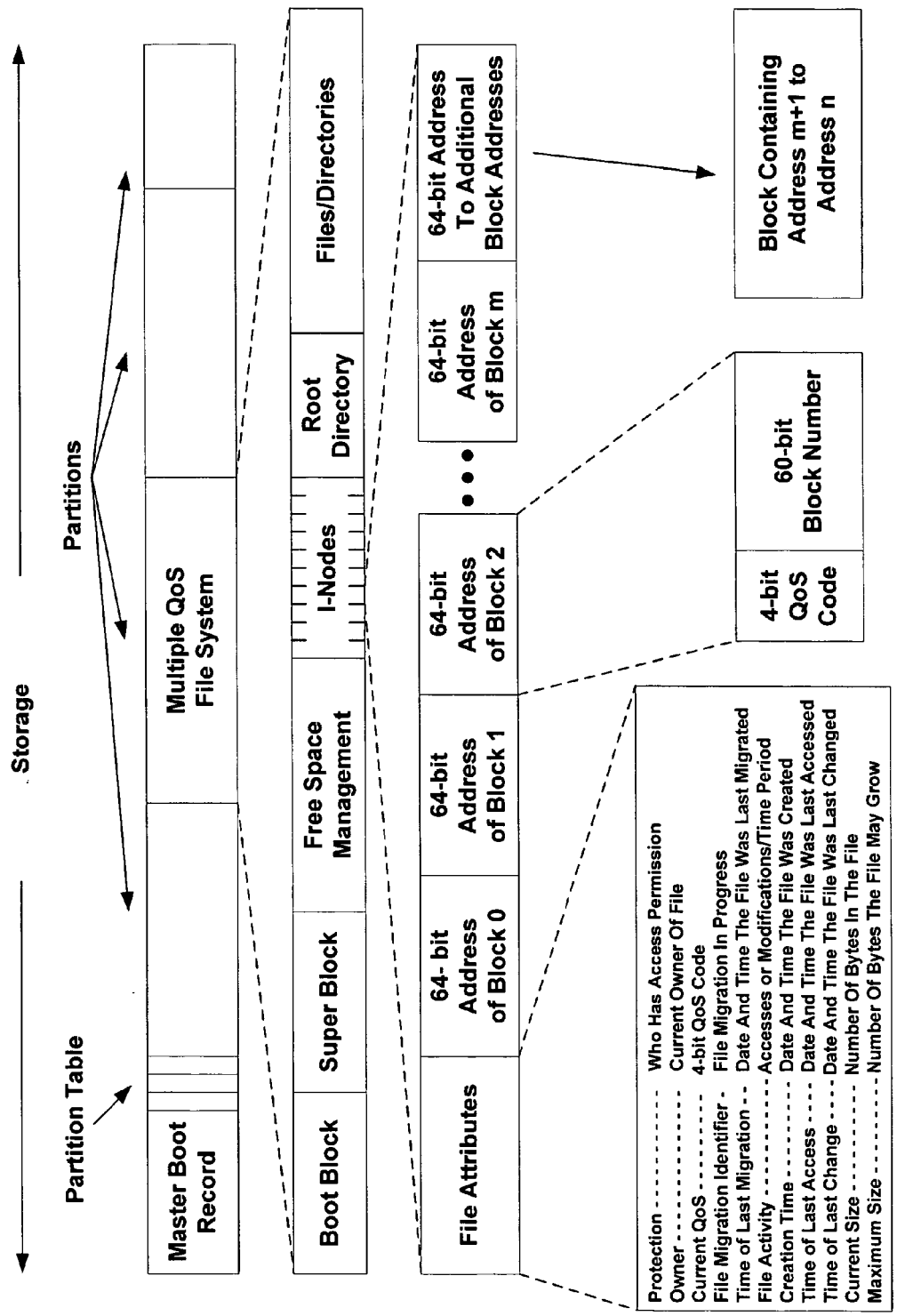
FIG. 8 illustrates a layout of a multiQoS file system.

FIG. 8 illustrates a possible layout of a multiQoS file system. In an embodiment, the layout is stored on secondary storage such as data storage subsystems shown in FIG. 1 and/or host memory. The storage is divided up into partitions, each capable of containing an independent file system. As shown, the partition contains a multiQoS file system. A master boot record (MBR) is used to boot the data storage system and contains a partition table that gives the first and last address of the partition, and marks a partition as active. When the data storage system is turned on a BIOS reads the boot block which loads an operating system containing the multi-QoS file system. In an embodiment, the multiQoS file system contains a super block with information about file system layout, including the number of i-nodes, the number of blocks, and other information for the IT administrator. The multiQoS file system includes free space management (information about free blocks) using bitmaps or list of pointers. Next, the multiQoS file system has i-nodes, the root directory (the top of the directories), files and directories. FIG. 8 suggests placing i-nodes in a linear array. However, the i-nodes are better arranged in a data structure that permits fast searching and dynamic sizing such as a B-tree. Cormen et al., *Introduction to Algorithms* (2003) describes B-trees at pages 434-454 and other suitable data structures for the i-nodes as well as for the file system and is incorporated by reference herein.

MultiQoS File System Representation

FIG. 8 also illustrates each i-node contains file attributes and addresses of data blocks such as disk blocks. The file attributes could include the following attributes:

| Field | Description |
| --- | --- |
| Protection | Who Has Access Permission |
| Owner | Current Owner Of File |
| Current QoS | QoS Code (e.g., 4-bit QoS code) |
| Migration Identifier | Migration In Progress (e.g., Migration flag = 1) |
| Time of Last Migration | Date And Time File Last Migrated |
| File Activity | Number Of Accesses Or Modifications Per Time |
| Creation Time | Date And Time The File Was Created |
| Time of Last Access | Date And Time The File Was Last Accessed |
| Time of Last Change | Date And Time The File Was Last Changed |
| Current Size | Number Of Bytes In The File |
| Maximum Size | Number Of Bytes The File May Grow |

A block can point to additional block addresses. FIG. 8 illustrates a block pointing to a block containing addresses m+1 to address n. If a block is 1 KB and address is 32-bits, a single indirect block may contain up to 256 block addresses. Further, a double indirect block can contain the addresses of 256 indirect blocks and so forth. Thus, the multiQoS file system represents data structures through blocks at fixed block addresses that in turn refer to other blocks via dynamically-assigned block addresses. An embodiment of the multiQoS file system using 64-bit block addresses referring to 4,096 byte blocks can grow to approximately 10 billion terabytes. A simple encoding uses some of the 64 bits of the block address to indicate a QoS.

The total address space represented by the bits in the block address (e.g. 64-bits or 32-bits) can be partitioned statically among the multiple VLUNs of the multiQoS file system. A fixed or variable number of the bits in the block address is used as an index to look up the corresponding VLUN, while the remaining bits are used to determine the address of the block within that VLUN. Such static partitioning allows each volume to grow independently to a very large maximum limit. In an embodiment, the highest order bits of the block address may be used as index into a table of VLUNs and the remaining bits be used to determine the block address in that VLUN. In an embodiment with two VLUNs, the file system can map one VLUN from the lowest address and grow the second VLUN in reverse from the highest address so that they grow together and better use the entire address space.

Large File Extent Migration and Access Tracking

Figure 9:
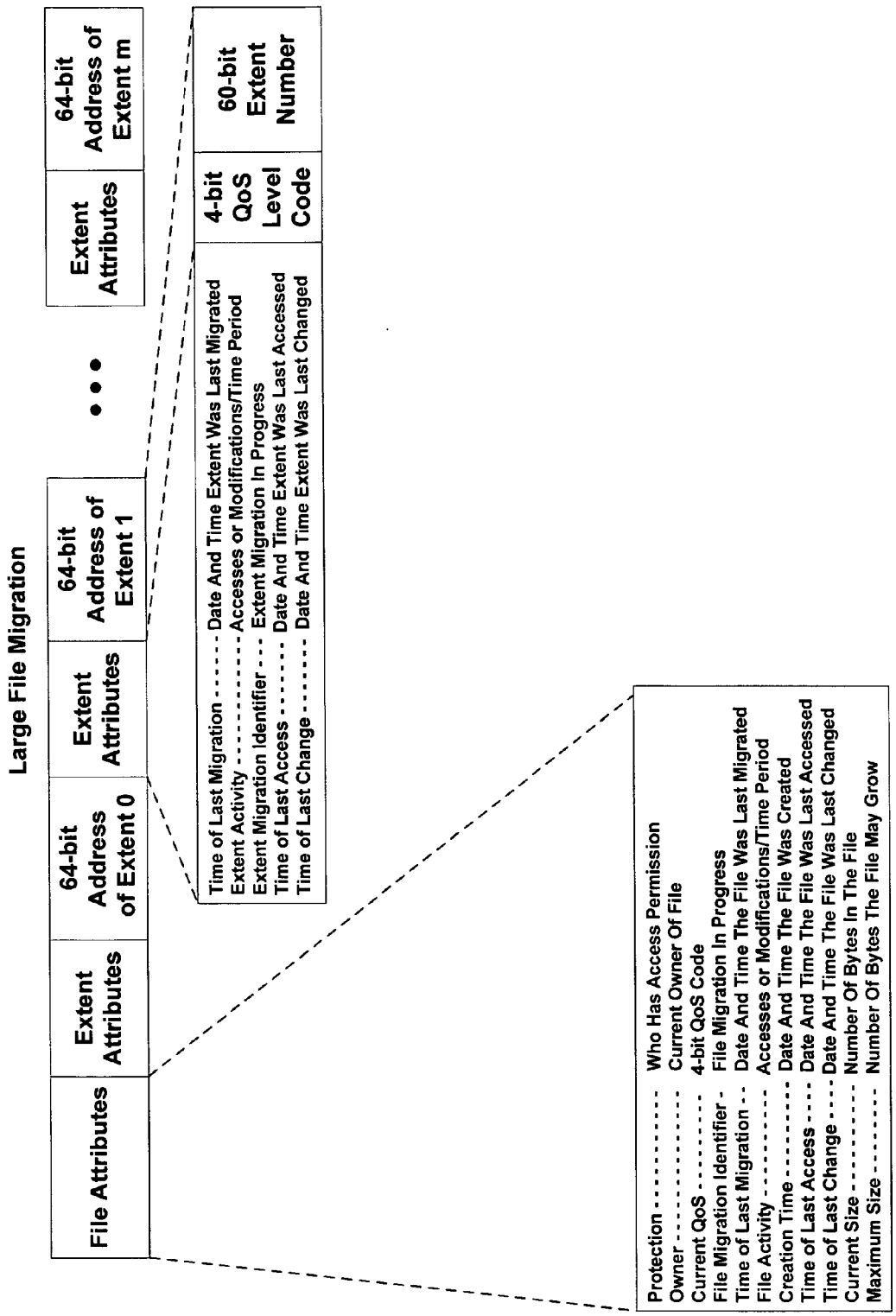
FIG. 9 illustrates file attributes and extent attributes of a large file.

An IT administrator can specify that the migration rules be applied to each extent (i.e., a contiguous allocation of blocks) of a large file. A large file is larger than a certain size such as 1 GB. FIG. 9 illustrates a possible layout of a large file. The large file has file attributes, plus a plurality of extents, and each extent has its own attributes, referred to as extent attributes. For large files stored on the multiQoS file system, the file system maintains extent attributes to permit access tracking and QoS information at each extent of the large file. As clients access a large file, the file system updates the access tracking information in the attributes of each extent. For example, the file system can separately track 4 MB extents of the large file.

To illustrate large file extent migration, assume the IT administrator sets a file activity rule that if any extent of a large file is not accessed once in a month, it migrates from high to low performance storage represented by high QoS VLUN to low QoS VLUN. Also assume if an extent of a large file is accessed more than once in a month, it migrates from low to high performance storage.

The file system uses the access tracking information in the extent attributes to select the QoS for each extent of the large file. When the file system migrates an inactive extent as defined by the IT administrator rules, the file system updates the QoS information in the extent attributes and performs the actual migration as described earlier in FIG. 7 for migrating whole files. After migration of an extent the large file will exist at multiple qualities of services, all under the same file name. A large database file containing the records of all new, current, and past employees can be stored in appropriate performance storage automatically using less IT administrators.

In an embodiment, the file system maintains a cache of access tracking information for a large file in host main memory and only saves the information to extent attributes periodically to reduce the overhead of maintaining the information.

FIG. 10A illustrates a map of 4-bit QoS codes representing four different QoS depicted in the UIs of FIGS. 4-6. The multiQoS file system can encode the QoS in part of the block address. FIG. 10B illustrates how 4-bits can represent sixteen QoS levels and the allocation among VLUN quality of service levels can differ in size. In a 64-bit system, the remaining 60-bits can be used to address approximately $10^{18}$ blocks (1 billion terabytes) within the VLUN in a multiQoS file system. Everywhere the file system uses a block address to point to a block, the file system can extract part of the block address (e.g., 4-bits) to index into an array of VLUN identifiers provided to the file system by the management controller 110. The multiQoS file system uses the remaining bits of the block address (e.g., 60-bits) to find the desired block in the selected VLUN.

Figure 11A:
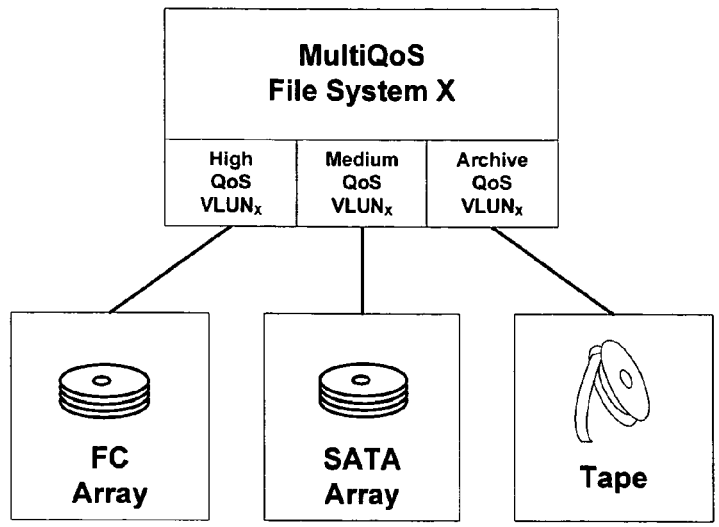
FIG. 11A illustrates a multiQoS file system, the associated VLUNs, and the performance grades of storage devices.

FIG. 11A illustrates a high level view of the multiQoS file system X and its VLUNs each having a QoS coupled to the performance of a storage device. In this embodiment, the management controller 110 configures the data storage system as described earlier so that higher performance storage such as Fibre Channel and Serial ATA are associated with the high QoS VLUN and medium QoS VLUN, respectively, and the lower performance storage such as tape is associated with low QoS VLUN.

Figure 11B:
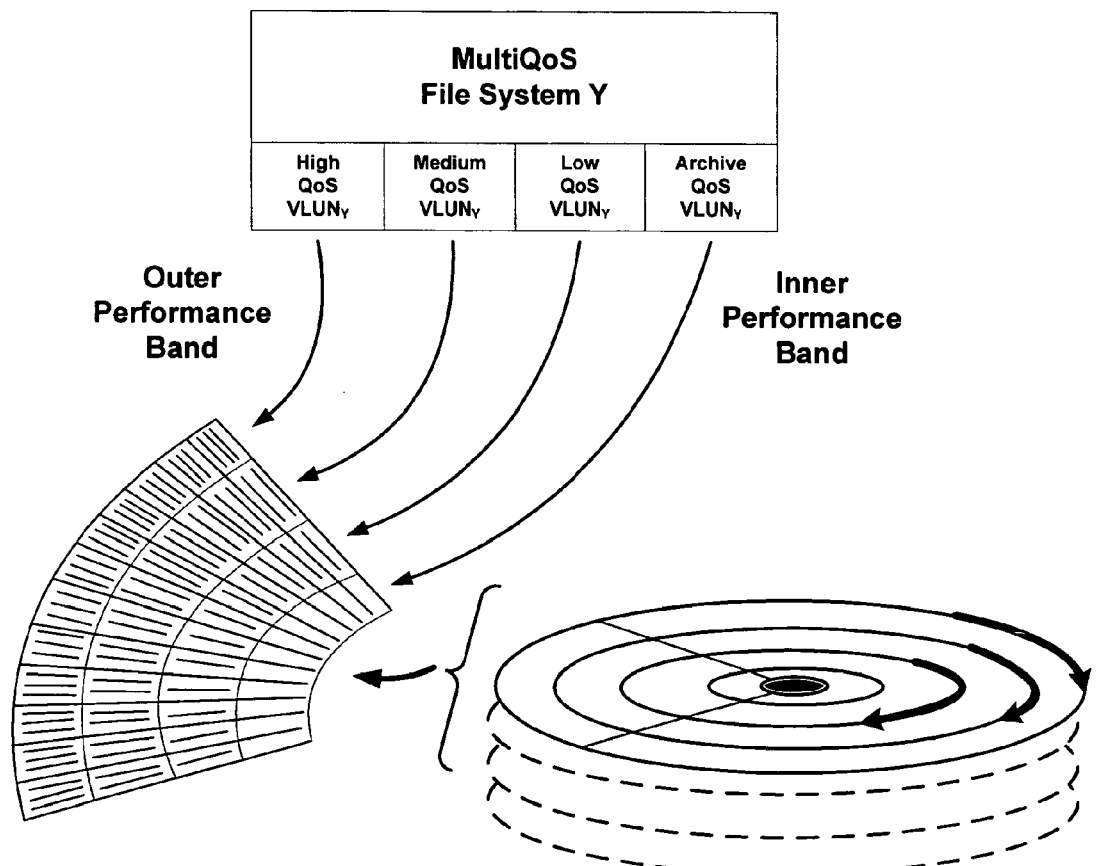
FIG. 11B illustrates a multiQoS file system, the associated VLUNs, and the performance bands of a storage device.

FIG. 11B is a high level view of the multiQoS file system Y and its VLUNs each coupled to a performance band of storage device(s). The management controller 110 configures the data storage system as described earlier so that the multiQoS VLUNs associate with corresponding performance bands of the storage devices.

Migrating Files to Different Qualities of Service

As time elapses from the initial creation of a file, the rules associated with the multiQoS file system may indicate that the file should move to a different QoS. For example, the rules might state that files not accessed in a month move to low QoS storage. Likewise, the rules might state that a file in low QoS storage should move to high QoS storage if modified. Alternatively, the IT administrator can manually direct the file system to migrate a file or set of files to a different QoS.

The file system discovers the need for a change in the QoS for a file by either an access to the file or by the file system scanning its files in a low priority background operation. In an alternative embodiment, a certain percent (e.g., 5%) of the total bandwidth of the data storage system can be reserved for scanning and/or migration. In either case, the file system triggers an activity to move the file to the desired QoS while maintaining access to the file and all other files in the file system. If the background activity of migration is run at a lower priority than production data it can be pre-empted as required. While production activity may continue while migration is in progress, migration rules may continue to be affected. It is suggested that, once begun, the migration of a file, an extent of a large file, or a large file be allowed to complete. Further, a recently migrated file or extent is prevented from migrating again until a reasonable time period has expired to prevent "thrashing" that is constant movement of files and extents back and forth between different QoS.

Figure 12:
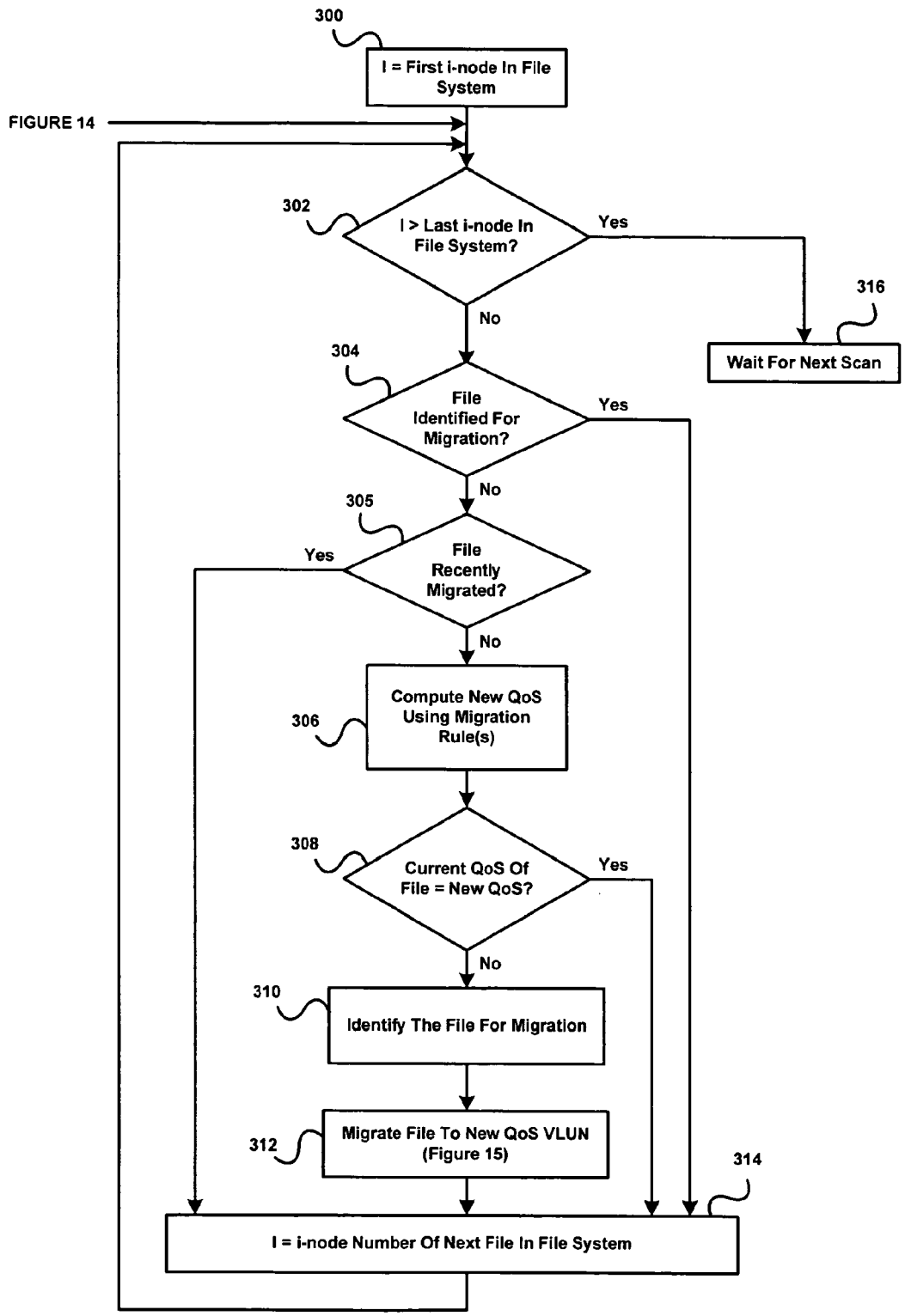
FIG. 12 illustrates a method of identifying files for migration between QoS levels.

FIG. 12 illustrates a method of identifying files for migration between different QoS. The host may run the method as a process based on a condition such as passage of a predetermined time period, a process priority, an amount of CPU recently consumed or the amount of time spent sleeping recently. Although the method is described serially below, the steps can be performed in parallel, for example, asynchronously or in a pipelined manner. There is no requirement the method be performed in the order shown except where indicated. Further, the steps are implemented by computer such as one or more host(s) described earlier. For brevity, we describe the methods as executed by a host.

Referring to step 300 of FIG. 12, the host assigns the first i-node of the multiQoS file system to a variable I. At step 302, the host tests if the variable I is greater than the last i-node in the file system. If the host has tested all the i-nodes, the method waits for the next scan of all the i-nodes of the multiQoS file system at step 316. The next scan may run as a background process, start after a predetermined time, or start when another condition is met. The condition can be based on the scan process's relative priority, recent consumption of CPU time for the scan process falls below a value, or the scan process has spent too much time sleeping recently.

Figure 15:
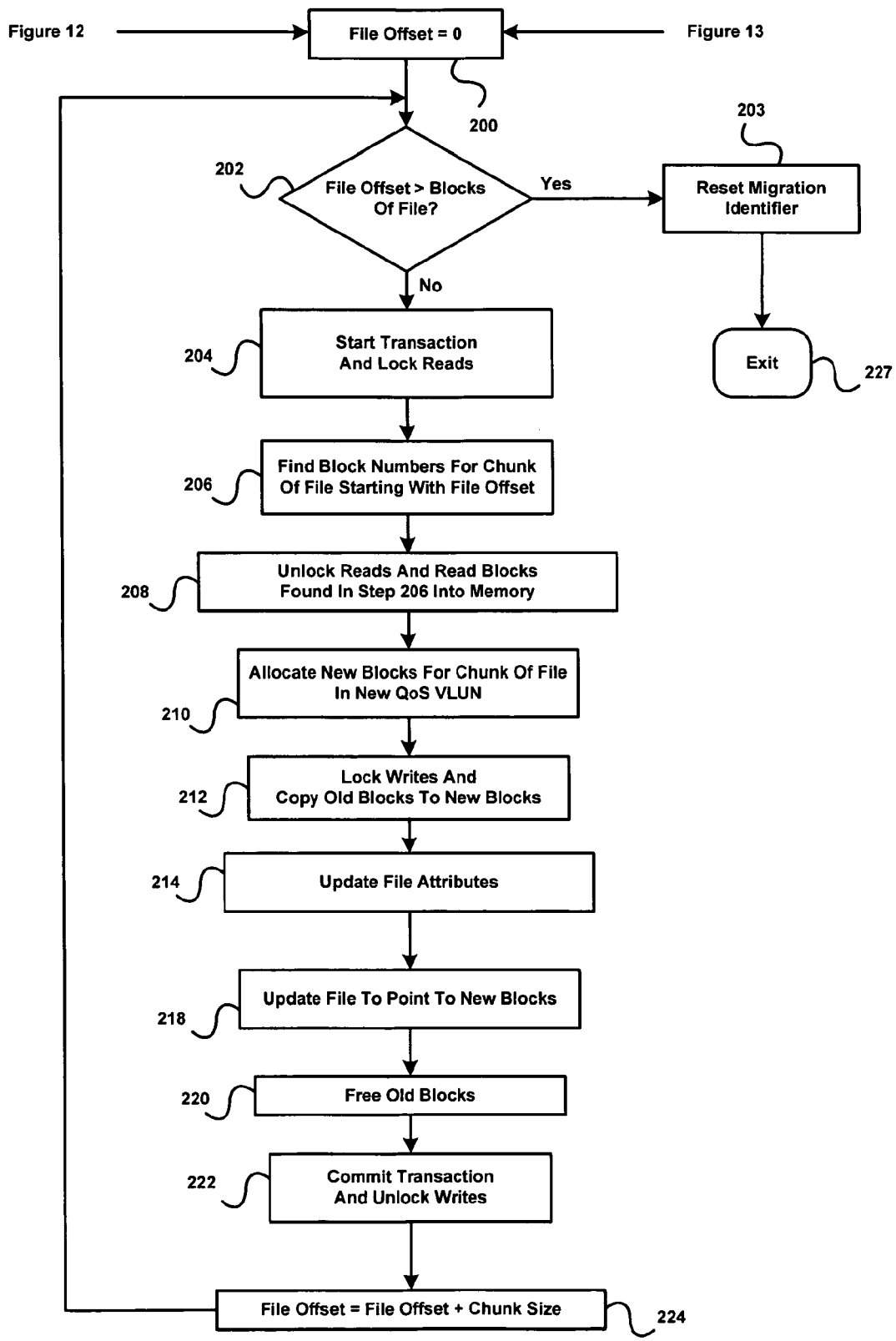
FIG. 15 illustrates a method of migration of a file between different QoS.

If the variable I is not greater than the last i-node at step 302, the host tests if the file of that i-node is identified for migration at step 304. The file is identified for migration in the file attributes, for example, by setting a migration identifier. If the file is not identified for migration, the host computes a new QoS for the file using the migration rule(s). In an embodiment, the host compares migration rule(s) to rule attribute(s) at step 306. In another embodiment, the host compares migration rule(s) to a value such as file size or capacity threshold at step 306. At step 308, the host tests if the current QoS equals the new QoS computed at step 306. If not, the host sets a migration identifier in the file attributes at step 310 to identify the file for migration. At step 312, the host migrates the file to the new QoS VLUN as illustrated in FIG. 15. In this embodiment, the migration of each file is initiated without waiting for all i-nodes to be checked, that is, scanned. Returning to step 304, if the file is already identified for migration or being migrated, the host has already determined the QoS of the file, and therefore skips the steps 306-312 and proceeds to step 314. At step 314, the host assigns the i-node number of the next file to variable I to repeat the method for the next file at step 302.

Figure 13:
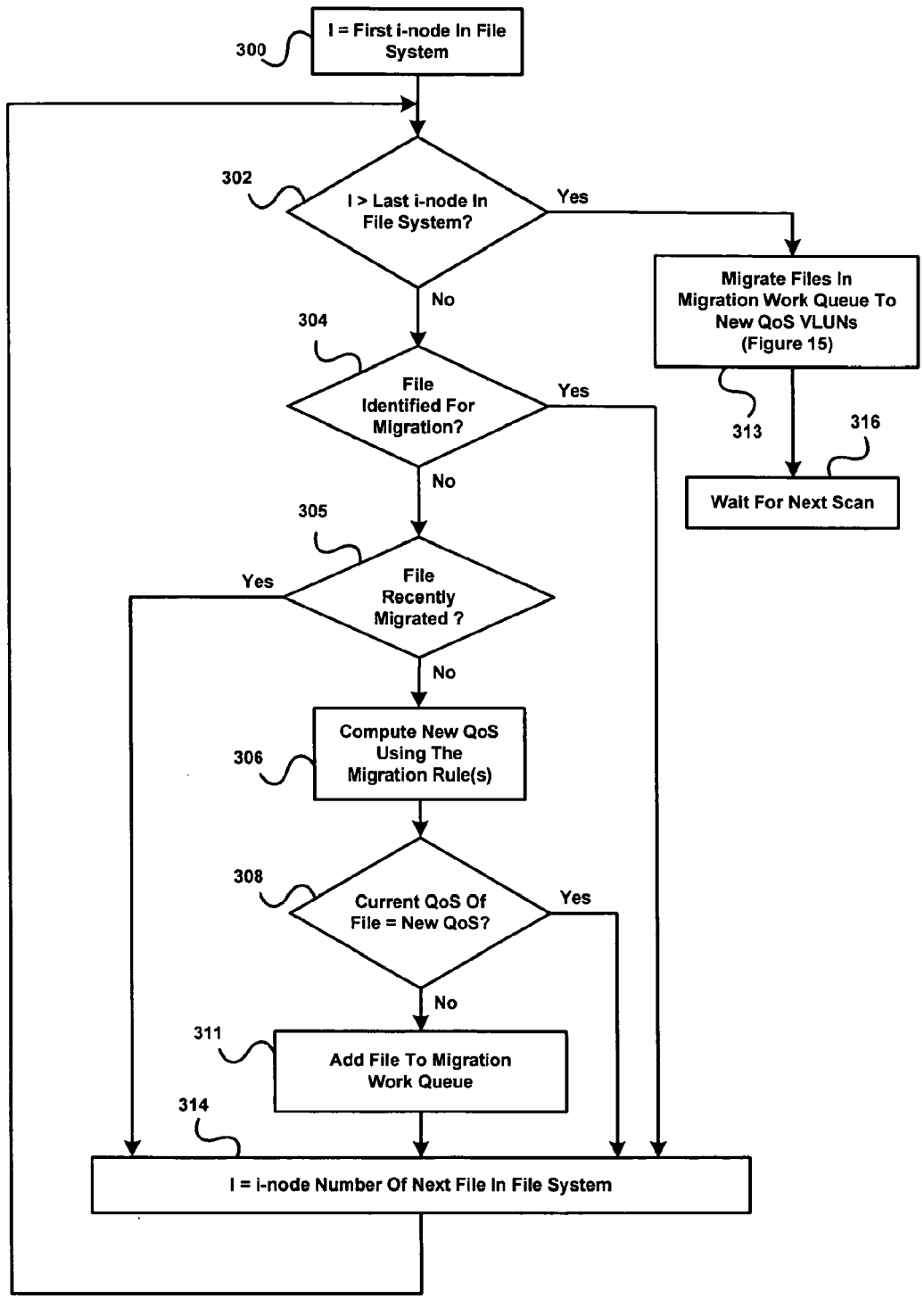
FIG. 13 illustrates another method of identifying files for migration between different QoS.

FIG. 13 illustrates another method of identifying files for migration between QoS. This method performs the steps 300, 302, 304, 306, 308, 310, 314, and 316 described in connection with FIG. 12, but the host scans all the i-nodes of the file system before it migrates files identified for migration at step 313 to the new QoS VLUN as illustrated in FIG. 15. In an alternative embodiment, the method of scanning and the migration are decoupled from each other. In such an embodiment, the scan method adds to a migration work queue the files or extents identified for migration and the migration method reads from the migrate work queue. The migration work queue may optionally be stored on nonvolatile storage devices (e.g., magnetic disk).

With regard to the method of scanning, the file system may use a B-tree to scan for files requiring migration where the leaf nodes are linked to siblings. The scan visits the first (i.e., leftmost) leaf node and follows the chain of links to the right to cover all the objects in the file system. As objects are added to and deleted from the B-tree, the B-tree needs to be rebalanced to ensure all the objects are the same distance from the root (i.e., the B-tree must treat all children the same). Rebalancing can change the sibling links that connect leaf nodes. To avoid interference with such rebalancing, a scan will place a lock on the B-tree to prevent modifications. However, holding a lock on the B-tree during the entire scan can impact production I/O.

In another embodiment, a method of scanning can be implemented to eliminate the need for holding a lock on the B-tree during the entire scan. The method yields the lock repeatedly during the scan for any rebalancing that might be pending.

Figure 17:
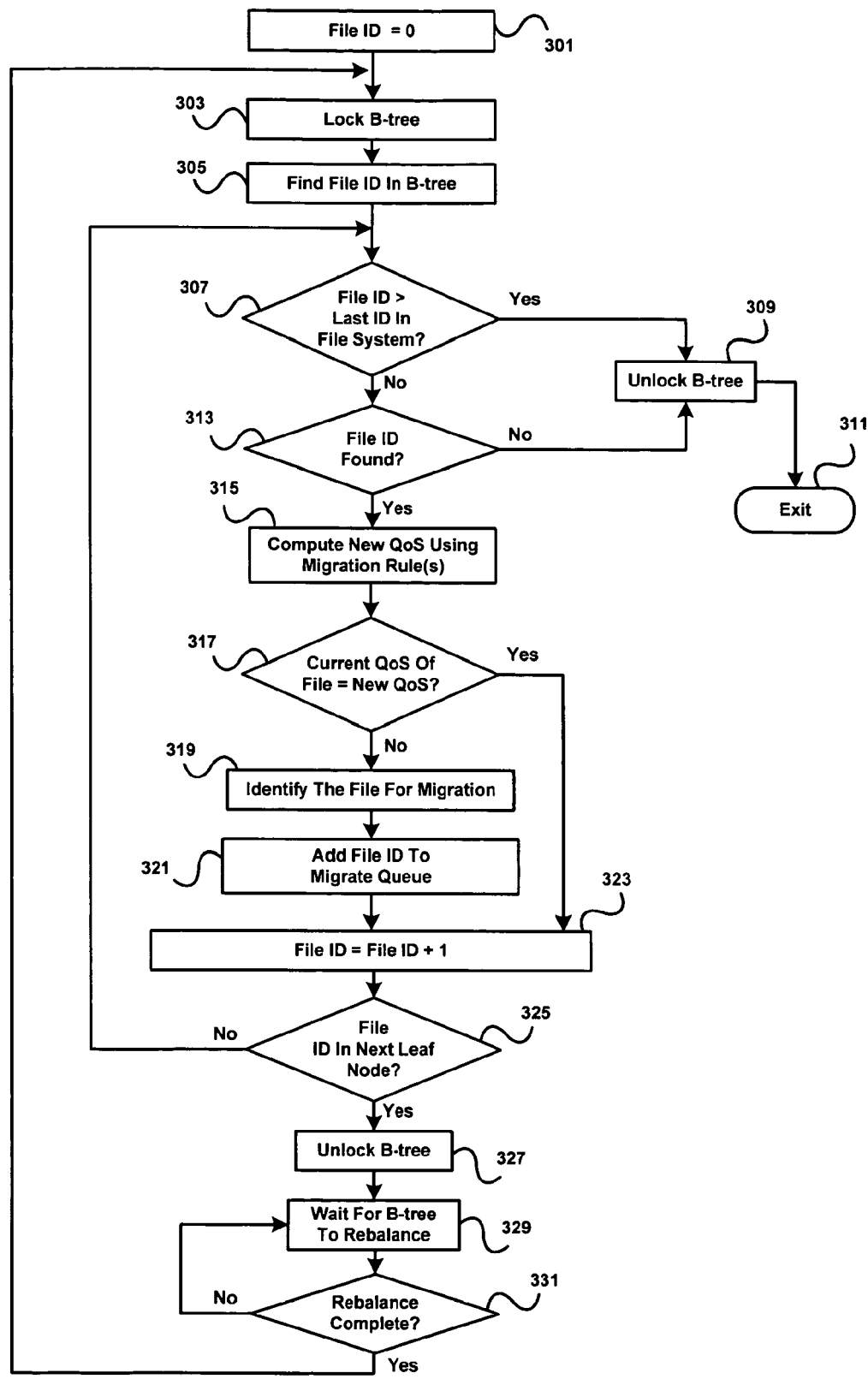
FIG. 17 illustrates another method of identifying files for migration.

Referring to step 301 of FIG. 17, the host sets the file ID to the lowest file ID (e.g., zero) in the file system. At step 303, the host places a B-tree lock to prevent rebalancing. At step 305, the host finds and reads the leaf block that contains the file ID. At step 307, the host tests if the file ID is greater than the last file ID in the file system. If so, the host unlocks the B-tree at step 309 and exits the method at step 311. If not, the host tests if the file ID is found at step 313. If not found, the host again unlocks the B-tree at step 309 and exits the method at step 311. If found, the host computes the new QoS using the migration rule(s) at step 315. At step 317, the host tests if the current QoS of the file equals the new QoS. If so the host proceeds to increment the file ID at step 323. If not, the host identifies the file for migration at step 319, adds the file ID to the migrate queue at step 321, and increments the file ID at step 323. At step 325, the host tests if the file ID is in the next leaf node. If not, the host returns to step 307. If so, the host unlocks the B-tree at step 327, waits for the B-tree to rebalance at step 329, and tests if rebalance is complete at step 331.

If not, the host returns to wait for the B-tree to rebalance at step 329. If so, the host returns to step 303 to lock the B-tree and repeat the method.

Figure 14:
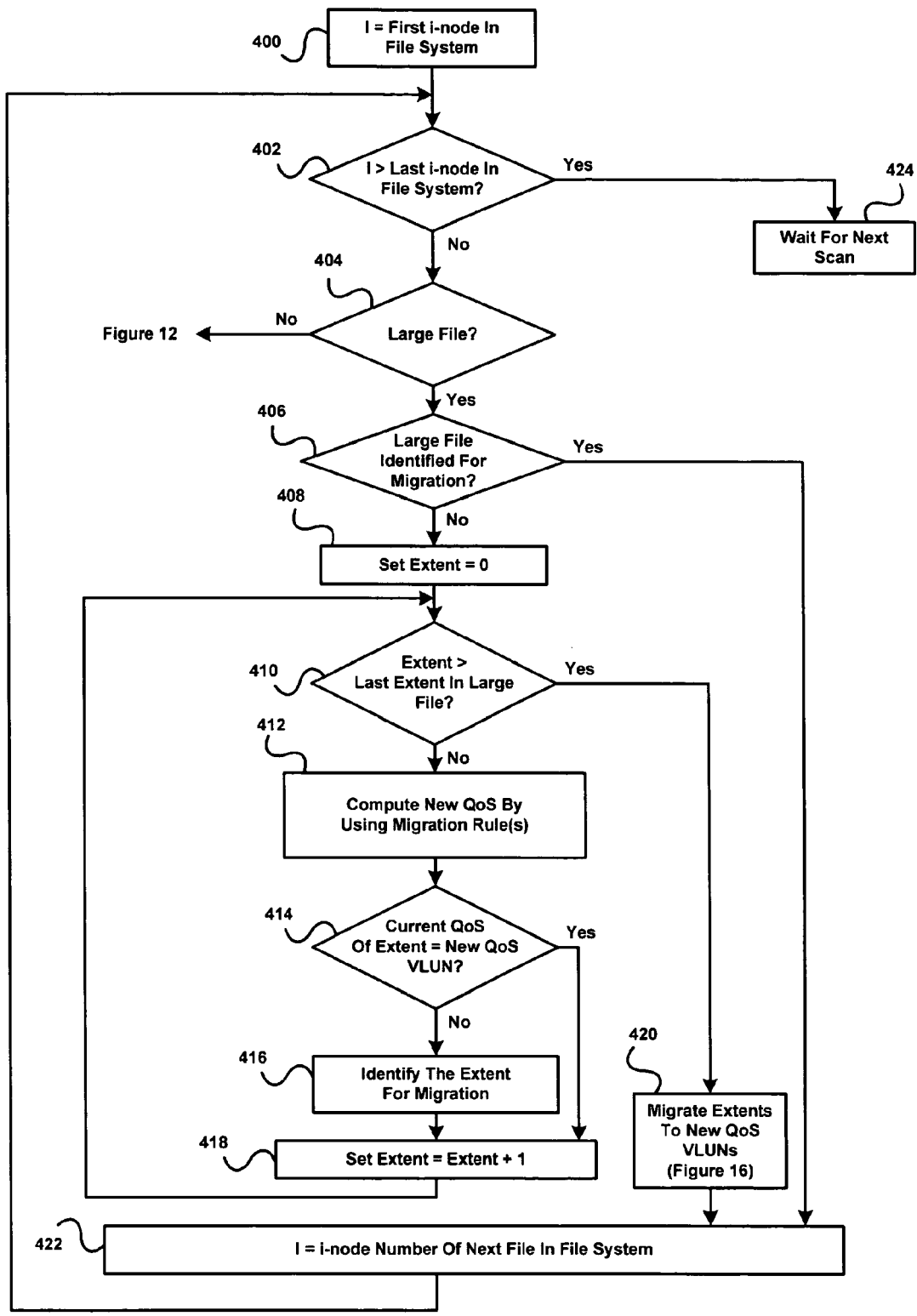
FIG. 14 illustrates a method of identifying extents for migration between different QoS.

FIG. 14 illustrates a method of identifying large files having extent attributes for migration between QoS. In general the host reads extent attributes as well as the file attributes, and manipulates and migrates each extent after its extent attributes meet the migration rule. Again, the host may run the method as a process based on the conditions mentioned earlier in connection with FIG. 12 or FIG. 13. Although the method is described serially below, the steps can be performed in parallel, for example, asynchronously or in a pipelined manner. Again, there is no requirement the method be performed in the order shown except where indicated, and again for brevity, we describe the methods as executed by a host.

Referring to step 400 of FIG. 14, the host assigns the first i-node of the multiQoS file system to a variable I. At step 402, the host tests if the variable I is greater than the last i-node in the file system. If so, the method waits for the next scan of all the i-nodes of the multiQoS file system at step 424. The next scan may run as a background process, start after a predetermined time, or start when another condition is met. The condition can be based on the scan process' relative priority, if recent consumption of CPU time for the scan process falls below a value, or if the scan process has spent too much time sleeping recently.

If the variable I is not greater than the last i-node at step 402, the host checks size of the file and/or the file attributes to determine if the file is a large file at step 404. If not, the host performs the method illustrated in FIG. 12. If it is a large file, the host checks if the large file is identified for migration at step 406. The large file is identified for migration in the file attributes, for example, by setting a migration identifier. If the file is not identified for migration, the host sets the extent equal to zero at step 408 and goes to step 410. At step 410, the host tests if the extent is greater than the last extent in the large file. If not, the host computes a new QoS by using the migration rule(s) at step 412. In an embodiment, the host computes the new QoS by comparing the migration rule(s) to one or more extent attributes at step 412. At step 414, the host reads the extent attributes to determine if the current QoS equals the new QoS computed at step 412. If not, the host identifies the extent for migration by, for example, setting a migration identifier in the extent attributes at step 416. At step 418, the host increments the value of the extent and loops back to step 410. Once the host determines that the extent being processed is greater than the last extent in the large file at step 410, the host performs the method of migration illustrated in FIG. 16. In an alternative embodiment, analogous to the method of FIG. 12, once the host sets the migration identifier in the extent attributes at step 416, the host migrates the extent to the new QoS VLUN without waiting for all the extents to be tested. In an alternative the scan and migration of extents is decoupled. Returning to step 406, if the large file is identified for migration, the host has already determined the QoS of the file, and therefore skips the steps 408-418 and proceeds to step 422. At step 422, the host assigns the i-node number of the next file in the file system to variable I and proceeds to step 402 and repeats the method of identification for the next i-node in the file system.

FIG. 15 illustrates a method of migration of a file between QoS. Generally, the file system first determines the new QoS for the file as described in connection with FIG. 12. The file system iterates through existing blocks of the file and allocates new blocks in the desired QoS. The blocks in each QoS contain an index in part of (e.g., the top bits) of their block address indicating the QoS. For each block in the file, the file system copies the data from the old blocks to new blocks, adjusts the file metadata to point to the new block and frees the old blocks. To reduce the space allocated concurrently, the file system allocates blocks in chunks at a time, such as 2 MB, copies the 2 MB of data, then frees the 2 MB of blocks in the old QoS.

The steps below can be performed in parallel and in a different order as long as it results in migration of a file between QoS. Referring to step 200 of FIG. 15, the host sets the file offset (i.e., the number of blocks into a file) to zero. At step 202, the host tests if the file offset is greater than the total number of blocks of the file. If so, the host has completed the method of migration, resets the migration identifier at step 203, and exits the method at step 227. If not, the host starts a transaction and locks the file for reading at step 204. The read lock regulates concurrent access, allowing reads but not writes to the file. At step 206, the host finds the block addresses for a chunk of the file starting with the file offset. At step 208, the host unlocks the read lock and reads the blocks found in step 206, into host memory. At step 210, the host allocates new blocks for the chunk of the file in the new QoS VLUN. At step 212, the host places a write lock on the file that prevents both reads and writes to the file by anyone other than the host, and copies the old blocks to the new blocks. At step 214, the host updates the file attributes (e.g., the rule attribute(s) and the new QoS). At step 218, the host updates the block addresses. At step 220, the host puts the old blocks on the free list, making them available for use to other programs, etc. At step 222, the host commits the transaction and unlocks writes. Finally, at step 224 the host adds the file offset to the chunk size to get the new value of file offset, and returns to the test at step 202.

Alternatively, the host can allocate at the outset the entire space required for a file (or extent) identified for migration on the target VLUN. This provides a contiguous allocation of blocks, that is, less fragmentation of the migrated file (or extent).

Figure 16:
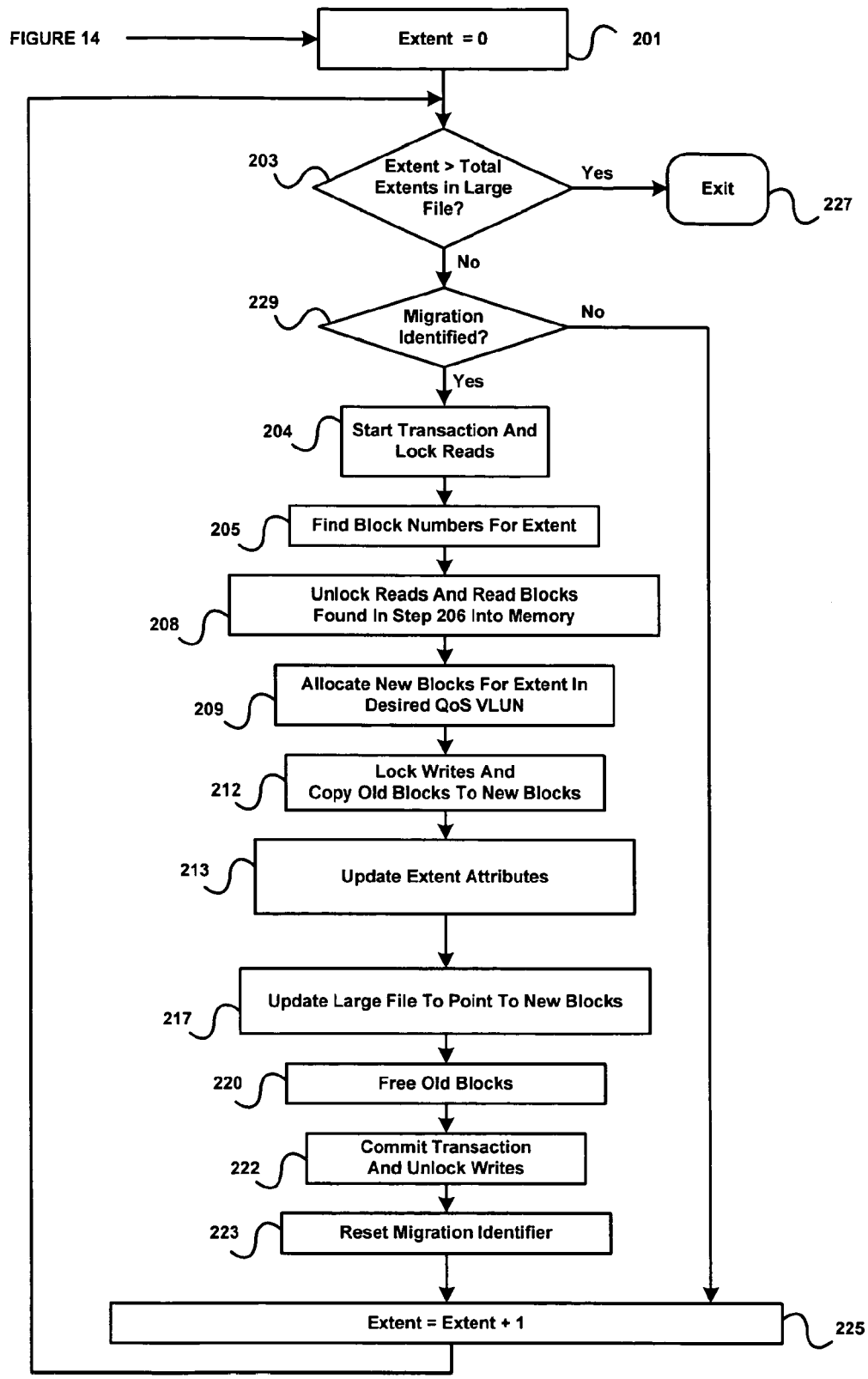
FIG. 16 illustrates a method of migration of extents between different QoS.

FIG. 16 illustrates a method of migration of a extent between QoS. Generally, the file system first determines the new QoS for the file as described in connection with FIG. 14. The file system iterates through the existing blocks of the file and allocates new blocks in the desired QoS. The block addresses at each QoS may contain an index in the top bits of their address indicating the QoS. For each block in the file, the file system copies the data from the old block to the new block, adjusts the metadata description of the file to point to the new block, and frees the old block. To reduce the amount of space allocated concurrently, the file system allocates blocks in small chunks at a time, such as 2 MB, copies the 2 MB of data, then frees the 2 MB of blocks in the old QoS.

The steps below can be performed in parallel and in a different order as long as it results in migration of a file between QoS. Referring to step 201 of FIG. 16, the host sets the extent equal to zero. At step 203, the host tests if the extent is greater than the total number of extents in the large file. If so, the host has completed the method of migration, exits the method at step 227. If not, the host tests if the migration identifier is set at step 229. If not, the host proceeds to step 225. If so, the host begins a transaction and places a read lock on the file at step 204. The read lock regulates concurrent access, allowing reads but not writes to the file. At step 205, the host finds the block addresses for the extent starting with the extent=0. At step 208, the host unlocks the read lock and reads the blocks found in step 206 into the host memory. At step 209, the host allocates new blocks for the extent in the desired QoS VLUN. At step 212, the host places a write lock on the file that prevents both reads and writes to the file by anyone other than the host, and copies the old blocks to the new blocks. At step 213, the host updates the extent attributes to the new QoS and at step 215, resets the extent attributes. At step 217, the host updates the large file to point to the new blocks. At step 220, the host puts the old blocks on the free list. At step 222, the host commits the transaction and unlocks writes. At step 223, the host resets the migration identifier of the extent. Finally, at step 225 the host increments the extent and loops back to the test at step 203. As an alternative, at step 420 of FIG. 14, the extents identified for migration may be added to a migrate queue to be picked up for migration by the method of FIG. 16.

In an embodiment, if the underlying multiQoS file system supports snapshots, the file system that migrates data to a different QoS migrates the blocks for all snapshots sharing the latest version of the data rather than allocating a whole new copy of the data as copy-on-write snapshots usually require.

While migrating a file to a different QoS, the file system may not have enough space in the new QoS to perform the migration. In that case, the file system sends an alert to trigger automatic expansion of the VLUN associated with the QoS or to notify of the space constraint.

Additional Access Patterns

As described above, a multiQoS file system uses the access time information available from file attributes to choose QoS. In an embodiment, a multiQoS file system tracks additional access information to avoid overreacting to stray references to files. For example, a multiQoS file system can associate an additional 32-bits to track reads and an additional 32-bits to track writes in the i-node information for each file. Each bit in these new fields corresponds to one day of access. The least significant bit corresponds to the day of the most recent access as indicated in the current i-node fields "atime" (read time), "mtime" (write time), or "crtime" (create time). The next bit corresponds to access of a day prior to the most recent access, and so on. Each 32-bit field shows accesses for approximately one month. In another example of access pattern tracking, a multiQoS file system can have rules such as accessed five days in a row or accessed four times in the last month.

Alternatively, the access pattern records may not be stored in the i-node, and instead may be stored in a system file or files. The system file or files will be indexed by the i-node. These system files are not visible to end-user and used by the file system.

Alternatively, the access pattern record of a file may be stored as an object in the B-tree that contains all the file system objects. The object ID for the access pattern record for a file would be associated with the file's i-node or be calculated from the file's object ID by replacing the type ID from type=i-node to type=access record.

Changing QoS Rules in a MultiQoS File System

After creating a multiQoS file system, the IT administrator may need to change the rules controlling the selection of QoS. For example, the IT administrator may add a new QoS to a multiQoS file system and need to add or change rules to make use of the new level.

After modifying the rules associated with a multiQoS file system, the existing files may no longer have the desired QoS. The file system determines the correct QoS for each file when accessed or scanned using the new rules and migrates the file if needed.

Migrating from a VLUN in a MultiQoS File System

An IT administrator may need to move the data of a multiQoS file system off a VLUN. For example, a VLUN may become badly fragmented or may be allocated on data storage subsystems that need to be removed from the data storage system. If the IT administrator wishes to remove a QoS from a multiQoS file system, he can change the rules so that no rule permits use of the obsolete QoS. After the file system has completely swept the multiQoS file system and migrated all files away from the obsolete QoS, the management software can detach the obsolete VLUN from the file system and delete the VLUN. In an embodiment, the IT administrator can create a replacement VLUN for an existing QoS in a multiQoS file system and migrate all files with blocks on the obsolete VLUN to the new VLUN.

Synthetic Namespace Views

A multiQoS file system provides a uniform view of the files as a single set to the IT administrator who may want to see which files the system has stored at each QoS. The multiQoS file system provides special subdirectories with names like ".lowqos" and ".highqos" that show the files stored at particular QoS. At any directory level, listing the contents of ".lowqos" shows only the files in the directory level assigned to the low QoS. To implement the special directories in stateless protocols like the NFS, the multiQoS file system adds the desired QoS to some unused field in the NFS file handle for the directory of interest. For example, the file handle for the directory "/a/b/c/.highqos" lists only the files in "/a/b/c" with high QoS. The multiQoS file system synthesizes a file handle for "/a/b/c/.highqos" using the file handle for the directory "/a/b/c" and with the new field in the file handle stating that the user wants only high priority files.

The multiQoS directory reading functions (corresponding to the NFS operations READDIR and READDIRPLUS) use the new field in the file handle for a directory and if not set, return all the files in the directory and if set, return only the files for the desired QoS. Brent Callaghan, *NFS Illustrated* (2000) describes the details of NFS and is incorporated herein by reference. In an embodiment, the multiQoS file system does not show the special directories.

A large file that has blocks in different QoS VLUNs will appear in all the synthetic QoS folders. This is implemented by tracking all the QoS levels used by the file in its i-node. In an embodiment, this is a bitmap with each bit corresponding to a QoS level. The IT administrator can specify rules in the UI using various file's attributes including: the size of the file, the time since the file's creation, the time since any user read the file, the time since any user modified the file, the owner of the file, the folder or directory containing the file, and the amount of free space in each QoS allocated to the file system.

The IT administrator rules can be combined to develop additional rules. For example, a rule may specify ".mp3" files go to low priority storage, and all other files created, read, or modified in the last month to high priority storage. The rules can select different qualities of service for user data as opposed to file system metadata (e.g., directories, indirect blocks, and i-nodes). IT administrators may save a set of rules so they can use them on many multiQoS file systems to enforce uniform policies.

What is claimed:

1. A system for managing storage of file data in multiple storage tiers, the system comprising:
 a plurality of data storage subsystems providing multiple classes of storage;
 a management controller, in communication with the plurality of data storage subsystems, and operable to associate each of a plurality of storage tiers with one or more of the plurality of data storage subsystems and to manage migration of file data across the plurality of storage tiers according to a set of predefined migration rules;

a management client in communication with the management controller over a communications network, the management client having a graphical user interface that permits a user to interact with the file data via a standard file system protocol as a contiguous file system having a hierarchical set of directories each having a set of files, each directory being a parent of a synthetic namespace having a set of synthetic file paths each corresponding to at least one of the set of predefined migration rules, so that:

the management controller associates one of the set of files with a first predefined migration rule when the file is not associated with any of the set of synthetic file paths; and the management controller associates the file with a second predefined migration rule that corresponds with one of the set of synthetic file paths and supersedes the first predefined migration rule when the file is associated with the synthetic file path by the user via the graphical user interface.

2. The system of claim 1, wherein each synthetic file path further corresponds to one of the plurality of storage tiers.

3. The system of claim 2, wherein:

the management controller automatically migrates the file data across the plurality of storage tiers according to the set of predefined migration rules; and associating the one of the set of files with the one of the set of synthetic file paths causes the file to become associated with the second predefined migration rule at the management controller in such a way that prevents automatic migration of the file from the corresponding one of the plurality of storage tiers.

4. The system of claim 2, wherein the graphical user interface permits the user to interact with the file data in such a way that:

the graphical user interface displays all the set of files in a particular directory of the hierarchical set of directories when the user navigates to the particular directory via the graphical user interface; and the graphical user interface displays only files from the set of files that are both in the particular directory of the hierarchical set of directories and associated with a particular storage tier when the user navigates, via the graphical user interface, to a particular synthetic namespace under the particular directory.

5. The system of claim 1, wherein:

the management controller manages migration of file data of the file across the plurality of storage tiers according at least to the first predefined migration rule when the file is not associated with any of the set of synthetic file paths; and the management controller manages migration of file data of the file across the plurality of storage tiers according at least to the second predefined migration rule when the file is associated with the synthetic file path corresponding to the second predefined migration rule.

6. The system of claim 1, wherein the user associates the one of the set of files with the one of the set of synthetic file paths via the graphical user interface by creating the file in the synthetic file path.

7. The system of claim 1, wherein the user associates the one of the set of files with the one of the set of synthetic file paths via the graphical user interface by moving the file to the synthetic file path.

8. The system of claim 1, wherein the synthetic file path is associated with the file as a file handle associated with the directory that is the parent of the synthetic namespace.

9. The system of claim 1, wherein the management controller is a multiple quality of service file system, and the plurality of storage tiers correspond to a plurality of qualities of service.

10. The system of claim 1, wherein the standard file system protocol is a network file system (NFS) protocol or a Common Internet File System (CIFS) protocol.

11. A method for managing storage of file data in multiple storage tiers, the method comprising:

displaying, via a graphical user interface of a management client, a set of files in a hierarchical set of directories of a virtually contiguous file system, the file system comprising file data stored across a plurality of remote data storage subsystems providing multiple classes of storage, the management client being in communication with a management controller operable to associate each of a plurality of storage tiers with one or more of the remote data storage subsystems and to manage migration of the file data across the plurality of storage tiers according to a set of predefined migration rules, and each of the hierarchical set of directories being a parent of a synthetic namespace having a set of synthetic file paths each corresponding to at least one of the set of predefined migration rules;

associating one of the set of files with a first predefined migration rule when the file is not associated with any of the set of synthetic file paths; and associating the file with one of the set of synthetic file paths via the graphical user interface, thereby causing the file to become associated with a second predefined migration rule at the management controller, the second predefined migration rule corresponding to the synthetic file path and superseding the first migration rule.

12. The method of claim 11, wherein associating one of the set of files with one of the set of synthetic file paths via the graphical user interface comprises:

receiving an instruction from a user via the graphical user interface to move the file from a current file path to the synthetic file path.

13. The method of claim 11, further comprising:

displaying each synthetic namespace via the graphical user interface as a namespace within the directory that is its parent; and displaying each synthetic file path as a subdirectory of the synthetic namespace, further corresponds to one of the plurality of storage tiers.

14. The method of claim 11, wherein each synthetic file path further corresponds to one of the plurality of storage tiers.

15. The method of claim 11, wherein:

the management controller automatically migrates the file data across the plurality of storage tiers according to the set of predefined migration rules; and associating the one of the set of files with the one of the set of synthetic file paths causes the file to become associated with the second predefined migration rule at the management controller in such a way that prevents automatic migration of the file from the corresponding one of the plurality of storage tiers.

16. The method of claim 11, wherein displaying the set of files in the hierarchical set of directories in the file system comprises:

displaying all the set of files in a particular directory of the hierarchical set of directories when a user navigates to the particular directory via the graphical user interface; and displaying only files from the set of files that are both in the particular directory of the hierarchical set of directories and associated with a particular storage tier when the user navigates, via the graphical user interface, to a particular synthetic namespace under the particular directory.

17. The method of claim 11, further comprising:

managing, by the management controller, migration of file data of the file across the plurality of storage tiers according at least to the first predefined migration rule when the file is not associated with any of the set of synthetic file paths; and managing, by the management controller, migration of file data of the file across the plurality of storage tiers according at least to the second predefined migration rule when the file is associated with the synthetic file path corresponding to the second predefined migration rule.

18. A non-transient memory having instructions stored thereon for managing storage of file data in multiple storage tiers, the instructions, when executed, causing a processor to perform steps comprising:

receiving file data from a remote management controller operable to manage migration of the file data across a plurality of storage tiers according to a set of predefined migration rules;

displaying the file data as a set of files in a hierarchical set of directories of a virtually contiguous file system, each of the hierarchical set of directories being a parent of a synthetic namespace having a set of synthetic file paths each corresponding to at least one of the set of predefined migration rules;

associating, by the remote management controller, one of the set of files with a first predefined migration rule when the file is not associated with any of the set of synthetic file paths; and communicating, to the remote management controller, an association between the file and one of the set of synthetic file paths, thereby causing the file to become associated with a second predefined migration rule at the management controller, the second predefined migration rule corresponding to the synthetic file path and superseding the first migration rule.

19. The memory of claim 18, wherein the instructions cause the processor to perform steps further comprising:

receiving an instruction to move the one of the set of files from a current file path to the one of the set of synthetic file paths, wherein the communicating step is performed in response to receiving the instruction.

20. The memory of claim 18, wherein the instructions cause the processor to perform steps further comprising:

receiving an instruction via a graphical user interface to navigate to a file path, wherein displaying the file data as a set of files in a hierarchical set of directories of an virtually contiguous file system comprises:

displaying, in response to the instruction, all the set of files in a particular directory of the hierarchical set of directories when the file path of the instruction is the particular directory; and displaying, in response to the instruction, only files from the set of files that are both in the particular directory of the hierarchical set of directories and associated with a particular storage tier when the file path of the instruction is a particular synthetic namespace under the particular directory.

* * * * *

UNITED STATES PATENT AND TRADEMARK OFFICE
CERTIFICATE OF CORRECTION

PATENT NO. : 8,650,168 B2  
APPLICATION NO. : 13/717450  
DATED : February 11, 2014  
INVENTOR(S) : Rathi et al.

Page 1 of 1

It is certified that error appears in the above-identified patent and that said Letters Patent is hereby corrected as shown below:

In the Specification:

In column 1, line 8, delete "2005," and insert -- 11/245,718, --, therefor.

In column 4, line 37, delete "FibreChannel" and insert -- Fibre Channel --, therefor.

In column 4, lines 38-39, delete "FibreChannel" and insert -- Fibre Channel --, therefor.

In column 4, lines 39-40, delete "FibreChannel" and insert -- Fibre Channel --, therefor.

In column 7, line 45, delete ""foo*.txt")" and insert -- "*foo*.txt") --, therefor.

In column 15, line 4, delete "215," and insert -- 215 --, therefor.

Signed and Sealed this  
Twenty-fourth Day of June, 2014

Michelle K. Lee  
*Deputy Director of the United States Patent and Trademark Office*